July 9, 1963 E. PRIESTLEY 3,096,955
AUTOMATIC LANDING SYSTEM FOR AIRCRAFT
Filed Nov. 30, 1961
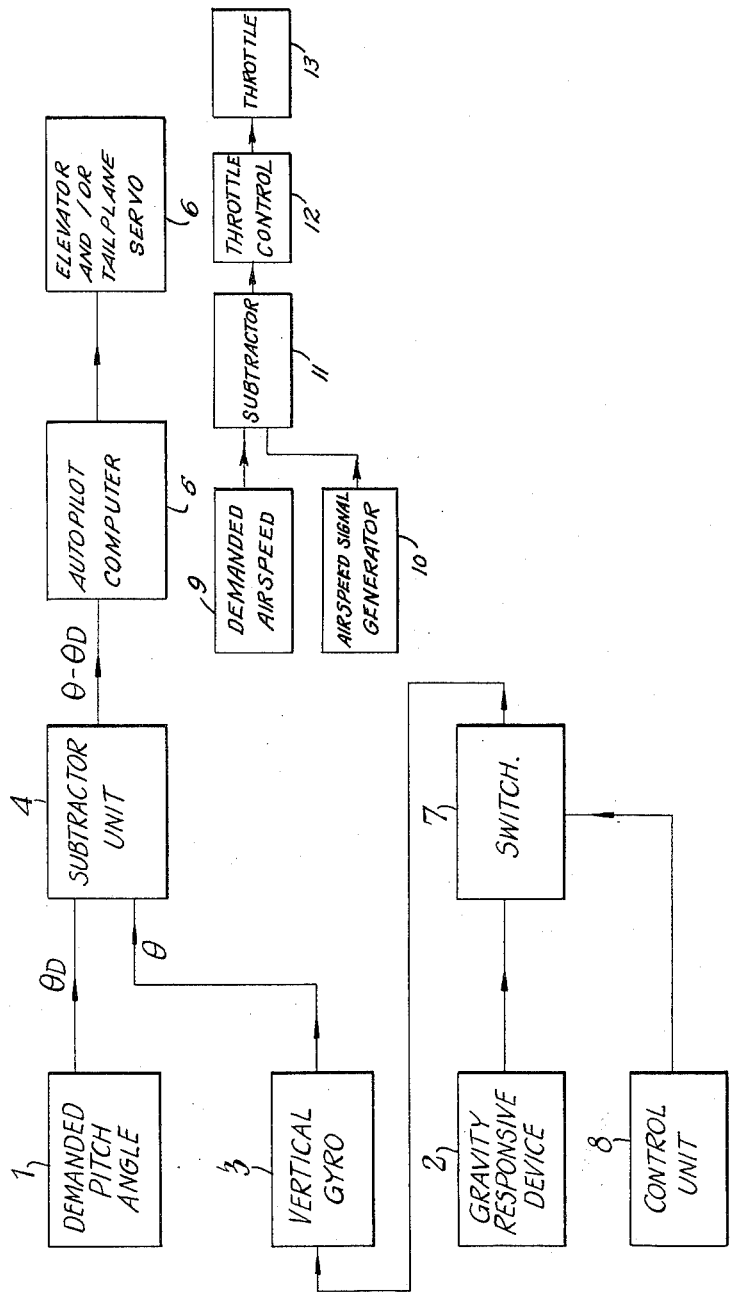
Inventor
Eric Priestley
By Bailey, Stephens & Huetly
Attorneys

United States Patent Office 3,096,955
Patented July 9, 1963

3,096,955
AUTOMATIC LANDING SYSTEM FOR AIRCRAFT
Eric Priestley, St. Albans, England, assignor to Elliott Brothers (London) Limited, London, England, a company of Great Britain
Filed Nov. 30, 1961, Ser. No. 155,974
Claims priority, application Great Britain Nov. 30, 1960
4 Claims. (Cl. 244—77)

This invention relates to improvements in automatic landing systems for aircraft and is particularly concerned with such systems (hereinafter referred to as being of the "kind specified") embodying a vertical gyro and a gravity responsive device which modifies the output of the vertical gyro to provide a signal representing the pitch angle of the aircraft, the system causing the aircraft to land in three phases during the first of which the aircraft is controlled by an instrument landing system to follow a glide path approaching the airfield, during the second or transition phase of which the aircraft is controlled by means comprising a demanded airspeed unit 9, an airspeed signal generator 10, a subtractor unit 11 and a throttle control unit 12 operating a throttle unit 13, of which the units 9, 10, 11 and 12 constitute an automatic throttle control tending to maintain the airspeed constant and pitch angle means responsive to the difference between the measured pitch angle of the aircraft and a predetermined pitch angle to tend to maintain the aircraft at a substantially constant pitch angle whereby the aircraft is caused to fly during the transition phase on a path which is an extension of the glide path of the first phase and during the third or landing phase of which the aircraft is caused to fly on a landing path under the control of a device such as, for example, a radio altimeter.

The transition phase in an aircraft landing system of the kind specified occurs because there is a stage when the aircraft approaches the airfield during which no positive positioning information is available due to the fact that the aircraft is too near the airfield for the instrument landing system to provide sufficiently accurate information and yet is too far from the airfield for the radio altimeter to provide sufficiently accurate or reliable information of the aircraft height relative to the landing ground as the approach terrain may be uneven.

Known automatic aircraft landing systems suffer from the disadvantage that during landing, an aircraft is subject to the effect of wind variation with altitude. This variation is sometimes referred to as wind shear and usually the wind velocity increases with altitude. Thus as the aircraft descends, the airspeed tends to change causing the automatic throttle control to operate to accelerate or decelerate the aircraft to maintain the airspeed constant. This acceleration or deceleration produces a displacement of the gravity responsive device so that the measured pitch angle of the aircraft no longer represents the true pitch angle and the pitch angle of the aircraft is incorrectly adjusted.

It is an object of the present invention to provide an improved automatic landing system for aircraft in which the disadvantage referred to is materially reduced.

According to the present invention there is provided in an aircraft automatic landing system of the kind specified, means operable in response to a signal representing a selected aircraft parameter to render the gravity responsive device inoperative to modify the output of the vertical gyro.

One embodiment of the invention will now be described by way of example, reference being made to the accompanying block diagram which shows a part of an aircraft automatic landing system incorporating the invention.

The aircraft automatic landing system of this example is arranged to cause an aircraft to land in three phases, and incorporates, in known manner, an instrument landing system for causing the aircraft to follow, in the first phase, a glide path in its approach to the airfield, a device such as, for example, a radio altimeter, for controlling the path of the aircraft in its third or landing phase, an automatic throttle control tending to maintain the airspeed constant during the second or transition phase and pitch angle means tending to maintain the pitch angle of the aircraft constant during the second phase. The pitch angle means comprises, in known manner, a device 1 which is adjustable to provide a signal representing a selected pitch angle $\theta_D$, a gravity responsive device 2, which may be a pendulous monitoring system, connected to a vertical gyro 3 to modify the output of the latter to provide a signal representing the measured pitch angle $\theta$ of the aircraft, a subtractor unit 4 to which both the selected and measured pitch angle signals are supplied to provide an output representing the difference of these signals, and an auto-pilot computer 5 responsive to the difference signal to control the elevator and/or tail-plane servo 6 of the aircraft in the sense to maintain the aircraft pitch angle substantially constant.

In accordance with this invention, the gravity responsive device 2 is connected to the vertical gyro 3 through a switch 7 which is operable in response to a signal derived from a control unit 8 to disconnect the device 2 from the gyro 3 so that the output from the latter is then not modified by the device 2. The control unit 8 is caused to operate the switch 7 at the commencement of the transition phase and this may be done by making the control unit 8 respond to a radio altimeter at a selected height of the aircraft or to a signal transmitted, for example, by a ground marker beacon.

In the operation of the landing system described, it will be apparent that at the commencement of the transition phase determined by the operation of the control unit 8, the gravity responsive device 2 is rendered inoperative so that the measured pitch angle $\theta$ derived from the vertical gyro 3 is not influenced by the device 2 or by any variations in the output of the device 2 as occur due to the aircraft being accelerated or decelerated by the automatic throttle control which tends to maintain the airspeed constant. Thus the effect of wind shear encountered during landing an aircraft has reduced effect on the path followed by the aircraft during the transition phase.

It will be appreciated that the control unit 8 may be made to respond to a signal representing any other aircraft parameter, such as the rate of change of airspeed or groundspeed exceeding a threshold value, to cut out the gravity responsive device 2. Airspeed could be derived from a conventional manometric transducer and groundspeed from a Doppler equipment.

What I claim is:
1. An automatic landing system for aircraft for causing the aircraft to land in three phases comprising a first phase, a transition phase and a landing phase, the system comprising a vertical gyro, a gravity responsive device to modify the output of the vertical gyro to provide a signal representing the measured pitch angle of the aircraft, an instrument landing system for causing the aircraft to follow a glide path approaching the airfield during the first phase, an automatic throttle control operable to maintain the aircraft airspeed substantially constant at least during the transition phase, pitch angle means responsive to the difference between the measured pitch angle of the aircraft and a predetermined pitch angle to tend to maintain the aircraft at a substantially constant pitch angle during the transition phase to cause the aircraft to fly on a path which is an extension of the glide path of the first phase, means operable in response to a selected aircraft parameter to render the gravity responsive device inoperative and means for causing the aircraft to fly on a landing path during the landing phase.

2. A system according to claim 1 wherein the aircraft parameter responsive means comprises a switch device connecting the gravity responsive device to the vertical gyro and a control unit responsive to a signal representing said aircraft parameter to operate said switch device and disconnect the gravity responsive device from the vertical gyro.

3. In an automatic landing system for aircraft embodying a vertical gyro and a gravity responsive device which modifies the output of the vertical gyro to provide a signal representing the pitch angle of the aircraft, the system being arranged to cause the aircraft to land in three phases during the first of which the aircraft is controlled by an instrument landing system to follow a glide path approaching the airfield, during the second or transition phase of which the aircraft is controlled by means comprising an automatic throttle control tending to maintain the airspeed constant and pitch angle means responsive to the difference between the measured pitch angle of the aircraft and a predetermined pitch angle to tend to maintain the aircraft at a substantially constant pitch angle whereby the aircraft is caused to fly during the transition phase on a path which is an extension of the glide path of the first phase and during the third or landing phase of which the aircraft is caused to fly on a landing path; the improvement comprising means operable in response to a signal representing the commencement of the transition phase to render the gravity responsive device inoperative to modify the output of the vertical gyro.

4. A system according to claim 3 wherein the signal responsive means comprises a switch device connecting the gravity responsive device to the vertical gyro and a control unit operable in response to the signal representing the commencement of the transition phase to operate the switch device and disconnect the gravity responsive device from the vertical gyro.

References Cited in the file of this patent

UNITED STATES PATENTS

| | | |
|---|---|---|
| 2,841,345 | Halpert | July 1, 1958 |
| 3,031,662 | Bond | Apr. 24, 1962 |